United States Patent

[11] 3,615,467

[72] Inventors Albert Lucien Poot
Kontich;
Robert Joseph Pollet, Berchem; Gerard Albert Delzenne, Gravenwezel, all of Belgium
[21] Appl. No. 691,213
[22] Filed Dec. 18, 1967
[45] Patented Oct. 26, 1971
[73] Assignee Gevaert-AGFA N. V.
Mortsel, Belgium
[32] Priority Jan. 3, 1967
[33] Great Britain
[31] 361/67

[54] PHOTOLYSABLE COMPOUNDS AND THEIR USES IN PHOTOGRAPHIC PROCESSES
10 Claims, No Drawings

[52] U.S. Cl. ............................................... 96/36.3,
250/65.1, 96/88
[51] Int. Cl. ......................................... G03c 5/00
[50] Field of Search. ........................................ 250/65.1;
96/36.3, 88

[56] References Cited
UNITED STATES PATENTS

| | | | |
|---|---|---|---|
| 3,202,507 | 8/1965 | Sprague et al. ............... | 96/90 |
| 3,374,094 | 3/1968 | Wainer et al. ................. | 96/90 |
| 3,409,457 | 11/1968 | Menzel......................... | 250/65.1 |
| 3,423,206 | 1/1969 | Hackmann .................... | 96/90 |

FOREIGN PATENTS 772,580  11/1967  Canada ........................ 96/36.3

*Primary Examiner*—Norman G. Torchin
*Assistant Examiner*—J. R. Hightower
*Attorney*—Alfred W. Breiner ABSTRACT: Radiation-sensitive compositions and recording materials containing compositions which are light- and heat-sensitive and which include a photolysable compound having the formula:

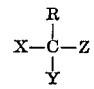

wherein
each of X, Y, and Z is an acyl radical, cyano, nitro, azido, a carbamyl group, a sulphamyl group, or wherein X and Y are joined to form a nucleus containing two strong electron-withdrawing groups, either of them attached to the carbon atom having the Z substituent, and R is hydrogen, azido, an alkyl radical, an aryl radical, or a heterocyclic radical, and a substance which, under the influence of radicals formed during exposure to light and heat, undergoes a chemical change are described. These compositions are useful in the production of a visible or developable latent image.

PHOTOLYSABLE COMPOUNDS AND THEIR USES IN PHOTOGRAPHIC PROCESSES

This invention relates to radiation sensitive compositions and recording materials containing compounds which are light- and heat-sensitive and which on their decomposition yield products with interesting properties for the production of a visible or developable latent image.

As is known, e.g., from United Kingdom Pat. Specification 900,586, J. Phot. Sci., Vol. 12, 1964, p. 189–190, and the published Dutch Pat. Application 6516925, photolytic unstable compounds producing an acid on exposure to light can be used in photographic recording and processing of photographic materials.

According to the present invention a radiation sensitive composition or a material is provided which is suited for recording and reproducing information in the form of electromagnetic radiation or heat and which comprises for that purpose a photolyzable compound that contains at least one carbon atom linked to at least three strong electron-withdrawing groups. Examples of strong electron-withdrawing groups include $\diagdown$CO, $\diagdown$SO$_2$ -C N, -NO$_2$, -N$_3$ and -I. Such compound more particularly corresponds to the following general formula:

wherein:
each of X, Y and Z represent an aryl radical, e.g., a carboxylic acid or sulfonic acid aryl radical, a cyano group, a nitro group, an azido group, an iodine radical, a carbamyl group including a substituted carbamyl group, a sulphamyl group including a substituted sulphamyl group, or wherein X and Y are joined together to form a nucleus containing two strong electron withdrawing groups each attached to the carbon atom having the Z substituent, R represents a hydrogen atom, -N$_3$, an alkyl radical including a substituted alkyl radical, an aryl radical including a substituted aryl radical, or a heterocyclic radical including a substituted heterocyclic radical.

The X, Y and Z substituents in the above general formula preferably represent a -CO-R$_1$, -SO$_2$R$_1$,

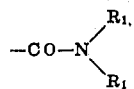

-CN or -NO$_2$ group, wherein R$_1$ represents an alkyl radical including a substituted alkyl radical, an aryl radical including a substituted aryl radical or a heterocyclic radical including a substituted heterocyclic radical.

New light-sensitive compounds suitable for use according to the present invention are represented by the following general formula:

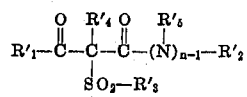

wherein:
each of R'$_1$ and R'$_2$ represent an alkyl radical including a substituted alkyl radical, an aryl radical, including a substituted aryl radical, or a heterocyclic radical, including a substituted heterocyclic radical, R'$_3$ represents an alkyl radical, including a substituted alkyl radical, or an aryl radical, including a substituted aryl radical, R'$_4$ represents a hydrogen atom, or an alkyl or substituted alkyl radical, R'$_5$ represents a hydrogen atom, or an alkyl radical including a substituted alkyl radical, and n represents 1 or 2.

A long chain aliphatic radical in the structure of the above compounds renders these compounds resistant to diffusion in hydrophilic colloid layers e.g. gelatin layers. For that purpose compounds in which at least one of the aliphatic radicals contains from 5 to 20 carbon atoms in straight line have proved to be suitable.

Specific examples of compounds suited for use according to the present invention are represented in the following table.

TABLE 1

(1) 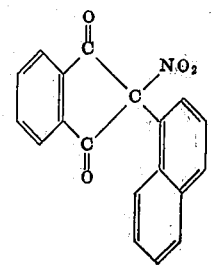

(2) 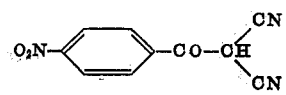

(3) 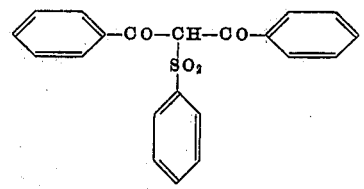

(4) 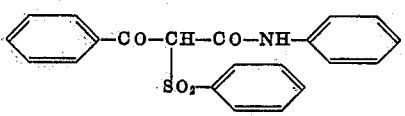

(5) 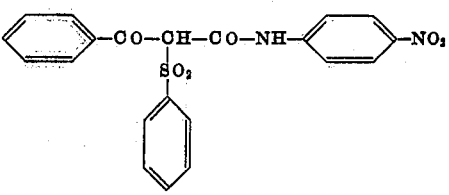

(6) 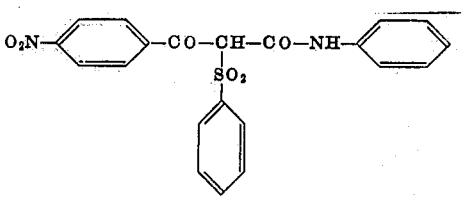

(7) 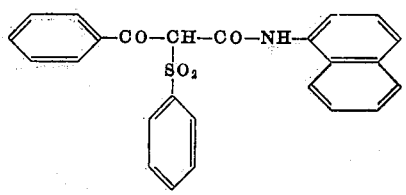

(8) 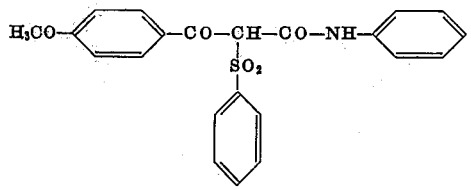

(9) 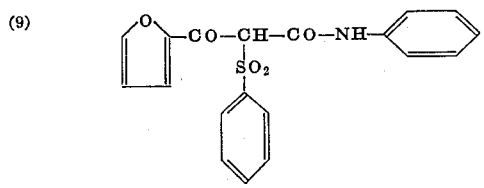

(10) 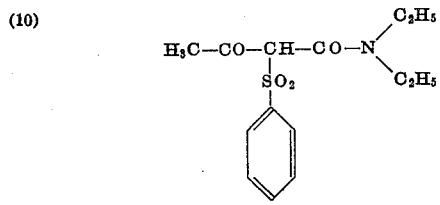

(11) 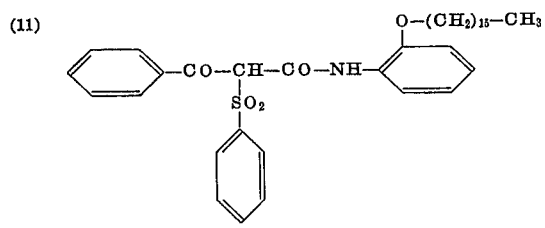

(12) 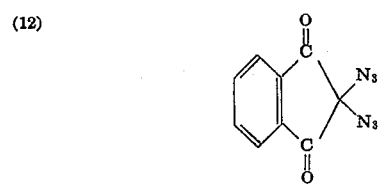

(13) 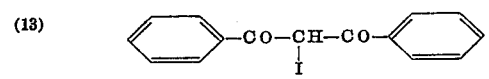

The preparation of compound 1 is described in J. Gen. Chem. U.S.S.R. (1956) 26, 657. The preparation of compound 2 is described in the Bul. Soc. Chim. France (1964) p. 413.

The compounds 3 to 11 can be prepared by allowing to react an α-halogenoketoacetamide, with a sulphinate, e.g. sodium sulphinate.

For a more detailed description reference is made to the preparation of benzoylacetanilide in Org. Synth. Coll. Vol. III, 108.

II. Preparation of α-halogeno-ketoacetamides

The ketoacetamide was dissolved in chloroform whereupon sulphuryl chloride or bromine was added dropwise. After refluxing and stirring for 1 to 2 hours the chloroform was distilled and the residue recrystallized.

III. Preparation of α-arylsulphonyl-ketoacetamides

The α-halogeno-ketoacetamide was dissolved in dimethylformamide together with a one- to twofold molar amount of sulphinate. After stirring the reaction mixture at 40° to 80° C. for 3 to 5 hours, it was poured in ice-water and finely divided therein by stirring for 1 hour. The precipitate was filtered and washed with water, dried and recrystallized.

Instead of carrying out the reaction in dimethylformamide, aqueous ethanol or another dipolar aprotic solvent may be used, but dimethylformamide is preferred.

Preparation of compound 9 of the above-mentioned table

1. Furoyl-2-acetanilide 182 g. of ethyl furoylacetate and 93 g. of aniline were treated in refluxing xylene and the ethanol formed distilled. When all the ethanol was distilled, the xylene was removed under vacuum and the residue recrystallized from carbon tetrachloride. Melting point: 104° C.

2. α-Chloro-furoyl-2-acetanilide 90 g. of furoyl-2-acetanilide were stirred in 600 ml. of dry chloroform and 56.7 g. of sulphuryl chloride was added dropwise to the mixture over a period of 10 min., while stirring at room temperature. The reaction mixture was stirred for further 2 hours and the chloroform removed. The resulting residue was recrystallized from methanol. Melting point: 133° C.

3. α-Phenylsulphonyl-furoyl-2-acetanilide 5.3 g. of α-chloro-furoyl-2-acetanilide together with 6.56 g. of sodium phenyl sulphinate were stirred for 4 hours at 40° C. in 75 ml. of dimethylformamide. The reaction mixture was poured into 500 ml. of ice-water. The precipitate formed was sucked off, washed with water and dried in an exsiccator. Yield: 6 g. Melting point: 161° C.

In the following table a survey of the reaction conditions, purification methods and melting points of the compounds, except compound 9, are given. The solvent used is dimethylformamide.

TABLE 2

| Compound of Table 1 | Moles of sulphinate | Type of halogen compound | Reaction time (h.) | Reaction temperature, °C. | Melting point | Purification |
|---|---|---|---|---|---|---|
| 3 | 1.2 | —Br | 3 | 80 | 175 | Washed with isopropylether. |
| 4 | 1.2 | —Cl | 3 | 80 | 155 | Washed with water. |
| 5 | 1.2 | —Cl | 3 | 80 | 218 | Recryst. from acetone. |
| 6 | 2 | —Cl | 3 | 70 | 133 | Recryst. from ethanol. |
| 7 | 2 | —Cl | 3 | 40 | 170 | Washed with methanol. |
| 8 | 2 | —Cl | 5 | 40 | 153 | Washed with water. |
| 10 | 2 | —Cl | 4 | 50 | 125 | Washed with water. |
| 11 | 1 | —Cl | 3 | 70 | 100 | Recryst. from ethanol. |

Compound 12 can be prepared according to a method described in Dokl. Akad. Nauk. U.S.S.R. 171 (1966) 869–71.

Compound 13 can be prepared according to a method described in J. Chem. Soc. 101, p. 997.

The following description illustrates the preparation of intermediate compounds used for preparing the photolyzable substances according to the present invention and the preparation of said substances.

I. Preparation of ketoacetamides

Equimolar amounts of a β-keto-ethyl ester and an amino compound were treated in refluxing xylene while the ethanol, produced in the condensation reaction, was distilled. After terminating the condensation reaction the xylene was distilled and the dry residue recrystallized.

Illustrative to the second general formula the following compounds prepared according to the present invention are listed in table 3.

TABLE 3

(1) 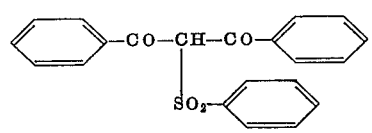

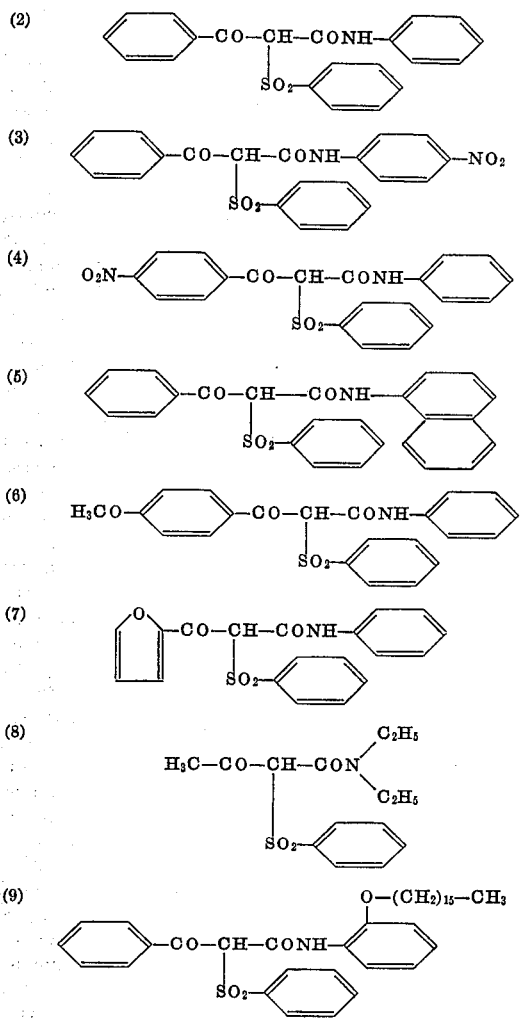

Compounds according to the invention can be prepared by allowing to react an α-halogenoketoacetamide in a dipolar aprotic solvent, preferably dimethylformamide, with a sulphinate, e.g. sodium sulphinate.

The term "photolyzable used in the description of the present invention with regard to the compounds containing at least one carbon atom having at least three electron-withdrawing groups, means that said compounds can be decomposed under the action of light in the wavelength range of 230 nm. to 400 nm. Upon exposure to active electromagnetic radiation, the photolyzable compounds undergo photolysis, whereby in the recording element a visible or a chemically or physically detectable change in accordance with the exposed portions is obtained. Imagewise heating results in the same effects as obtained by exposure to light, so that the compounds according to the general formula may be characterized as being light- and heat-sensitive.

The compounds according to the above-mentioned general formula are suited for use in a recording material wherein an imagewise modification of pH is the basis of a color change or a chemical reaction as a result of which the transparency, solubility in a suitable stripping liquid, hydrophobicity or hydrophilicity of the recording layer is changed.

The imagewise production of an active methylene compound opens the possibility to obtain an imagewise color reaction e.g. with a diazonium salt. The imagewise change in acidity can be used in an imagewise acid catalysis of a cross-linking, polymerization or hardening reaction or can be used in a pH-sensitive color reaction.

The acid catalysis of cross-linking, polymerization or hardening reaction can be used in the preparation of a planographic printing master, a screen printing master, an etch resist or any other type of resist image that can be produced by selective removal of exposed or unexposed portions of a polymer composition containing the photolyzable substance or the photolyzable substance alone as is illustrated in the examples.

Further as a result of the photolytic radical formation, the above mentioned compounds can be used as photoinitiators in free radical polymerization, e.g., of vinyl monomers.

Having stated in general the concepts of this invention a detailed description will now be given of the preparation, composition and structure of various light- and heat-sensitive recording materials, as well as their exposure and use in reproduction of light and/or heat information.

According to a first technique a light- and heat-sensitive recording material suited for planographic printing is prepared by coating a solution of the photolyzable compound onto a hydrophilic or hydrophilizable support, e.g., an aluminum support, or an aluminium-laminated paper or resin support. After drying and imagewise exposure to light and/or heat, the recording layer can be imagewise removed with an aqueous sodium hydroxide solution leaving according to the type of photolyzable compound a negative or positive printing image.

Photolyzable compounds suited for the production of a negative printing image (i.e. an image wherein the unexposed portions of the recording layer are removed with aqueous sodium hydroxide without deterioration of the exposed portions) are compounds 2 to 10 of the above-mentioned table 1.

Photolyzable compounds suited for the production of a positive printing image according to the above technique (i.e. an image wherein the exposed portions of the recording layer are removed with aqueous sodium hydroxide without deterioration of the unexposed portions) are compounds 1 to 11.

According to a second technique, a light- and heat-sensitive recording material suited for the production of a resist image is prepared by coating a mixture of a said photolyzable compound together with a monomer that can be polymerized in the presence of the photolytically or thermolytically formed radicals. Thus, by imagewise ultraviolet irradiation a polymer image is formed. The monomer in the unexposed areas can be selectively removed, e.g., by transfer on a receiving paper or by washing out with a suitable solvent.

It is also possible to obtain such a polymer image by imagewise heating, e.g., by imagewise irradiating the recording layer, which in that case contains the monomer intimately mixed with one or more substances which absorb electromagnetic radiation and convert at least a part of the absorbed radiation into heat. The use of electromagnetic radiation absorbing substances converting absorbed radiation into heat is described, e.g. in the published Dutch Pat. Application 6606719.

According to a third technique a light- and heat-sensitive recording material suited for the production of a resist image is prepared by coating onto a suitable support a polymer composition that can be cross-linked under the influence of hydrogen ions. Such compositions are described in the published Dutch Pat. Application 6516925, which application has to be read in conjunction herewith. Thus, e.g., according to the present invention, the compound No. 1 of table 1 on exposure to U.V. light yields a radical, which by means of water produces hydrogen ions under the influence of which the polymeric material as described in the above application is insolubilized.

According to a fourth technique a light- and heat-sensitive recording material, suited for the production of a visible image by a change in the pH of the recording layer, is prepared by coating onto a suitable support a mixture of a photolyzable compound, such as compound 1, some traces of water and a pH indicator that undergoes a change in color or of which the color fades by a pH change. Together with the pH indicator a base can be applied in order to create a basic medium, whose basicity is reduced or removed on exposure of the said compound. It is self-explanatory that the pH indicator, the water and also the base can be applied to the recording layer after the exposure. In connection with the use of a pH indicator for the detection of an image-wise produced acid, reference is made to the United Kingdom Pat. Specification 1,070,863, wherein detailed information about suitable pH indicators and processing is given.

The photolyzable compounds for use in a recording process wherein the image formation is based on a color reaction are preferably incorporated into a porous support, e.g. paper, or into a hydrophilic colloid layer; e.g. containing a water-soluble polymeric compound such as gelatin, polyvinyl alcohol or poly-N-vinylpyrrolidone. The recording layer before exposure preferably contains some water.

The recording layer compositions containing a cross-linkable polymer may contain the photolytic compound in the dried binder material in concentrations as low as 2 percent till 20 percent by weight.

The following examples illustrate the present invention.

EXAMPLE 1

A solution of 1 g. of α-phenylsulphonyl-benzoylacetanilide in 50 ccs. of acetone was coated in such a way onto a grained aluminum sheet so as to obtain 1.15 g. of dry product per sq. m.

The dried layer was contact-exposed for 10 min. through a silver image line transparency with a high pressure mercury vapor bulb (80 W.) and subsequently rubbed with a cotton swab soaked with 0.2 N aqueous sodium hydroxide. The unexposed portions of the recording layer were removed. Before inking with a lipophilic offset printing ink, the uncovered aluminum parts of the planographic printing plate were made hydrophilic with a 1 percent aqueous solution of phosphoric acid. A negative image was obtained.

EXAMPLE 2

Example 1 was repeated but instead of applying α-phenyl-sulphonyl-benzoylacetanilide, α-phenylsulphonyldibenzoyl-methane was applied in the same concentration. The obtained printing plate was of the same quality as that obtained according to the procedure of example 1.

EXAMPLE 3

A solution of 1 g. of α-benzoyl-α-phenylsulphonyl-N-(2-n-hexadecyloxyphenyl)-acetamide in 50 ccs. of acetone was coated onto a grained aluminum sheet in such a way that 1.5 g. of dry product was present per sq.m. The dried light-sensitive layer was contact-exposed for 10 min. through a silver image line transparency and was subsequently rubbed with a cotton swab soaked with a 0.2 N aqueous sodium hydroxide solution. The parts of the recording layer corresponding with the exposed areas were removed and a positive image was left.

The developed plate was hydrophilized in the exposed areas with a 1 percent aqueous solution of monosodium phosphate, and thereupon inked with a fatty offset printing ink.

EXAMPLE 4

This example illustrates the photoinitiating activity of the compounds listed in the table 4.

The test was carried out as follows:

10 ccs. of methyl methacrylate were dissolved in 10 ccs. of benzene in a borosilicate glass tube, which was sealed after the addition of the indicated amount of photolyzable compound and after the air had been expelled by nitrogen gas bubbling through the solution for 30 min. The sealed tube was exposed with a 300 w. high-pressure mercury vapor bulb placed at a distance of 18 cm. After the indicated reaction time the polymer was precipitated in methanol and weighed.

TABLE 4

| Compound of Table 1 | Concentration, mole/litre | Reaction time (h.) | Percent of polymer |
| --- | --- | --- | --- |
| 4 | 5.10⁻³ | 1 | 11.3 |
|   |   | 2 | 20.2 |
|   |   | 3 | 24.1 |
|   |   | 4 | 28.5 |
|   |   | 5 | 29.2 |
| 11 | 10⁻² | 5 | 27.7 |
| 3 | 10⁻³ | 1 | 8.5 |
|   |   | 2 | 11 |
|   |   | 3 | 12.8 |
|   |   | 4 | 14.5 |
|   |   | 5 | 16.4 |
| Control |   | 2 | 1.48 |
|   |   | 5 | 3.7 |

We claim:

1. An electromagnetic radiation and heat-sensitive composition comprising a polyzable compound having the formula:

wherein
each of X, Y, and Z is an aryl radical, cyano, nitro, azido, a carbamyl group, a sulphamyl group, or wherein X and Y are joined to form a nucleus containing two strong electron-withdrawing groups, either of them attached to the carbon atom having the Z substituent, and R is hydrogen, azido, an alkyl radical, an aryl radical, or a heterocyclic radical, and a substance that under the influence of the radicals formed by exposure of said photolyzable compound to light and/or heat undergoes a change in its color; or a cross-linking, polymerization or hardening reaction.

2. An electromagnetic radiation and heat-sensitive composition comprising a photolyzable compound having the formula:

wherein
each of X, Y, and Z is cyano, nitro, a $-CO-R_1$, $-SO_2R_1$, or

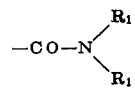

group, wherein $R_1$ is an alkyl radical, an aryl radical, or a heterocyclic radical, and R is hydrogen, an alkyl radical, an aryl radical, or a heterocyclic radical, and a substance that under the influence of the radicals formed by exposure of said photolyzable compound to light and/or heat undergoes a change in its color; or a cross-linking, polymerization or hardening reaction.

3. An electromagnetic radiation and heat-sensitive composition according to claim 2 wherein the said composition is used as a recording material which includes a recording layer which contains the said photolyzable compound and a pH indicator.

4. An electromagnetic radiation and heat-sensitive composition according to claim 3 wherein the recording layer contains a base.

5. An electromagnetic radiation and heat-sensitive composition according to claim 3 wherein the recording layer contains a hydrophilic binding agent.

6. An electromagnetic radiation and heat-sensitive composition according to claim 3 wherein the recording layer contains a diazonium slat.

7. An electromagnetic radiation and heat-sensitive composition according to claim 2 containing said photolyzable compound and a vinyl monomer.

8. An electromagnetic radiation and heat-sensitive composition according to claim 2 containing a photolyzable compound corresponding to one of the following formulas:

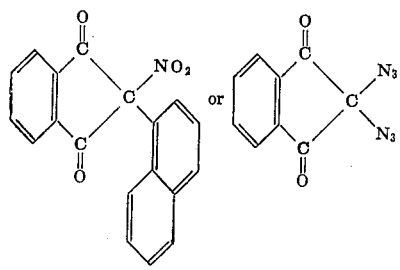

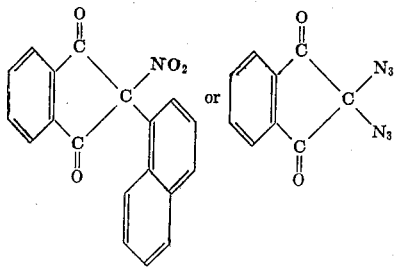

wherein
each of X, Y and Z is cyano, nitro, a $-CO-R_1$, $-SO_2R_1$, or

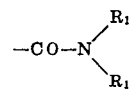

group, wherein $R_1$ is an alkyl radical, an aryl radical, or a heterocyclic radical, and
R is hydrogen, an alkyl radical, an aryl radical, or a heterocyclic radical,
and treating the exposed layer with an alkaline aqueous solution in order to remove the more alkali-soluble portions of the exposed recording layer.

water and a polymer composition that can be cross-linked under the influence of hydrogen ions.

9. A process for producing a resist image comprising imagewise exposing to ultraviolet radiation and/or to heat of a recording layer comprising a photolyzable compound having the formula:

10. A process for producing a resist image according to claim 9 wherein the recording layer is imagewise removed from an aluminum support whose uncovered areas after the removal of the more alkali-soluble portions of the recording layer are hydrophilized.

* * * * *